US007609786B2

(12) United States Patent
Keerthi (10) Patent No.: US 7,609,786 B2
(45) Date of Patent: Oct. 27, 2009

(54) CHANNEL ESTIMATION FOR A COMMUNICATION SYSTEM USING SPECTRAL ESTIMATION

(75) Inventor: Arvind Vijay Keerthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 698 days.

(21) Appl. No.: 11/021,292

(22) Filed: Dec. 22, 2004

(65) Prior Publication Data
US 2005/0163257 A1    Jul. 28, 2005

Related U.S. Application Data

(60) Provisional application No. 60/540,088, filed on Jan. 28, 2004.

(51) Int. Cl.
*H03D 1/00* (2006.01)
*H04B 1/69* (2006.01)
(52) U.S. Cl. ........................................ 375/340; 375/130
(58) Field of Classification Search ................ 375/340, 375/130, 316, 348, 144, 147; 370/342, 335; 455/137, 231, 303
See application file for complete search history.

(56) References Cited

U.S. PATENT DOCUMENTS 5,440,590 A * 8/1995 Birchler et al. ............. 375/347
6,298,035 B1   10/2001 Heiskala
6,493,380 B1 * 12/2002 Wu et al. .................... 375/224
2003/0043887 A1   3/2003 Hudson
2003/0231725 A1  12/2003 Scarpa
2003/0236080 A1 * 12/2003 Kadous et al. .............. 455/226.1
2004/0228267 A1 * 11/2004 Agrawal et al. ............. 370/203
2005/0135509 A1 *  6/2005 Mantravadi et al. ......... 375/340

FOREIGN PATENT DOCUMENTS

JP         05-75568        3/1993
JP         10-031065       2/1998

(Continued)

OTHER PUBLICATIONS

Lesir et al "on Performance Study Of Blind Identification Of A Multipath Channel" XP10516095A IEEE (2000).

(Continued)

*Primary Examiner*—Khai Tran
(74) *Attorney, Agent, or Firm*—Sandip S. Minhas; Jeffrey D. Jacobs (57) ABSTRACT

Techniques for performing channel estimation in a multi-carrier system are described. A frequency response estimate is initially obtained for a wireless channel based on a narrow-band pilot sent on different sets of subbands in different symbol periods or a wideband pilot sent on all or most subbands in the system. Spectral estimation is performed on the frequency response estimate to determine at least one frequency component of the frequency channel estimate, with each frequency component being indicative of a delay for a channel tap in an impulse response estimate for the wireless channel. A channel estimate for the wireless channel is then obtained based on the frequency component(s) determined by the spectral estimation. This channel estimate may be a channel profile, the impulse response estimate, an improved frequency response estimate, a signal arrival time, or some other pertinent information regarding the wireless channel.

34 Claims, 7 Drawing Sheets

FOREIGN PATENT DOCUMENTS

| | | |
|---|---|---|
| JP | 11-215543 | 8/1999 |
| JP | 11-237475 | 8/1999 |
| JP | 2000-168950 | 6/2000 |
| JP | 2000-196540 | 7/2000 |
| JP | 2000-244371 | 9/2000 |
| JP | 2000-286822 | 10/2000 |
| JP | 2000-341239 | 12/2000 |
| JP | 2002-168936 | 6/2002 |
| WO | 2005064870 | 11/2005 |

OTHER PUBLICATIONS

Zhang "Blind OFDM Channel Estimation through Linear Precoding: A Subspace Approach" XP10638282A (2002).

International Search Report, PCT/US05/003006, International Search Authority, European Patent Office, Jun. 6, 2005.

Written Opinion, PCT/US05/003006, International Search Authority, European Patent Office, Jun. 6, 2005.

International Preliminary Examination Report, PCT/US05/003006, International Preliminary Examining Authority, United States, Mar. 16, 2007.

* cited by examiner

CHANNEL ESTIMATION FOR A COMMUNICATION SYSTEM USING SPECTRAL ESTIMATION

CLAIM OF PRIORITY UNDER 35 U.S.C. §119

The present Application for Patent claims priority to Provisional Application No. 60/540,088 entitled "TIME-SYNCHRONIZATION AND CHANNEL SOUNDING USING SPECTRAL ESTIMATION" filed Jan. 28, 2004, and assigned to the assignee hereof and hereby expressly incorporated by reference herein.

BACKGROUND

I. Field

The present invention relates generally to communication, and more specifically to channel estimation for a communication system.

II. Background

In a wireless communication system, a radio frequency (RF) modulated signal may travel via a number of signal paths from a transmitter to a receiver. If the signal paths have different delays, then a received signal at the receiver would include multiple instances of the transmitted signal at different gains and delays. This time dispersion in the wireless channel causes frequency selective fading, which is characterized by a frequency response that varies in magnitude and phase across the system bandwidth.

An accurate estimate of a wireless channel between the transmitter and the receiver is normally needed in order to effectively receive a data transmission sent by the transmitter. Channel estimation is typically performed by sending a pilot from the transmitter and measuring the pilot at the receiver. Since the pilot is made up of modulation symbols that are known a priori by the receiver, a channel response may be estimated as a ratio of the received pilot symbols to the transmitted pilot symbols.

Pilot transmission represents overhead in the system. Thus, it is desirable to minimize pilot transmission to the extent possible. This may be achieved by sending a "narrowband" pilot on a small portion of the system bandwidth and using this pilot to obtain a channel estimate (e.g., a frequency response estimate or an impulse response estimate) for the wireless channel. Regardless of whether the channel estimate is in the time domain or the frequency domain, the resolution of the channel estimate is generally limited by the bandwidth of the pilot used for channel estimation. Thus, a channel estimate with only coarse resolution may be obtained from a single transmission/instance of a narrowband pilot. This coarse channel estimate may provide poor performance if used by the receiver to recover the data transmission.

There is therefore a need in the art for techniques to derive a channel estimate with good resolution based on a narrowband pilot.

SUMMARY

Techniques for obtaining an improved channel estimate with high resolution based on a narrowband pilot or a wideband pilot are described herein. These techniques may be used for a wireless or wireless multi-carrier communication system (e.g., an OFDM-based system) and may also be used for the forward link (or downlink) as well as the reverse link (or uplink).

In an embodiment for performing channel estimation, a first channel estimate is initially obtained for a communication channel (e.g., a wireless channel). This first channel estimate may be a frequency response estimate obtained from either (1) a narrowband pilot that is sent on different sets of subbands in different symbol periods or (2) a wideband pilot that is sent on all or a large number of subbands in the system. Spectral estimation is then performed on the first channel estimate to determine at least one frequency component of this channel estimate. If the first channel estimate is a frequency response estimate, then spectral estimation may be performed on channel gains for different subbands. Each frequency component of the frequency response estimate is indicative of a delay for a channel tap in an impulse response estimate for the wireless channel. The spectral estimation may be performed using various techniques, as described below. A second channel estimate for the wireless channel is then obtained based on the frequency component(s) determined by the spectral estimation.

The second channel estimate may comprise (1) an impulse response estimate for the wireless channel with L channel taps, where $L \geq 1$ (2) an improved frequency response estimate for the wireless channel with channel gains for up to N total subbands, (3) a channel profile indicative of the long-term time-averaged energy of the channel taps in the impulse response estimate for the wireless channel, (4) a delay value indicative of an arrival time of a signal transmitted via the wireless channel, or (5) some other pertinent information regarding the wireless channel. The second channel estimate may be used in various manners. For example, the channel gains of the improved frequency response estimate may be used for matched filtering or equalization of a data transmission received via the wireless channel. The delay value for the arrival time may be used for time synchronization of the data transmission.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The channel estimation techniques described herein may be used for various wireless and wireline multi-carrier communication systems. Multiple carriers may be obtained with orthogonal frequency division multiplexing (OFDM), discrete multi tone (DMT), some other multi-carrier modulation techniques, or some other construct. OFDM effectively partitions the overall system bandwidth into multiple (N) orthogonal subbands, which are also referred to as tones, subcarriers, bins, and frequency channels. With OFDM, each subband is associated with a respective subcarrier that may be modulated with data.

For clarity, the channel estimation techniques are described below for a wireless OFDM-based system. One such system is an orthogonal frequency division multiple access (OFDMA) system that can support communication for multiple wireless terminals simultaneously. With OFDM, up to N modulation symbols (e.g., for data and/or pilot) may be sent on the N total subbands in each OFDM symbol period (or simply, "symbol period"). These modulation symbols are converted to the time-domain with an N-point inverse fast Fourier transform (IFFT) to obtain a "transformed" symbol that contains N time-domain samples or chips. To combat inter-symbol interference (ISI), which is caused by frequency selective fading, C chips of the transformed symbol are repeated to form an OFDM symbol that contains N+C chips, where C is typically a fraction (e.g., ¼ or ⅛) of N. The C repeated chips are often referred to as a cyclic prefix, and C is the cyclic prefix length.

Data and pilot may be transmitted in various manners in an OFDM-based system. Several exemplary transmission schemes are described below.

Figure 1A:
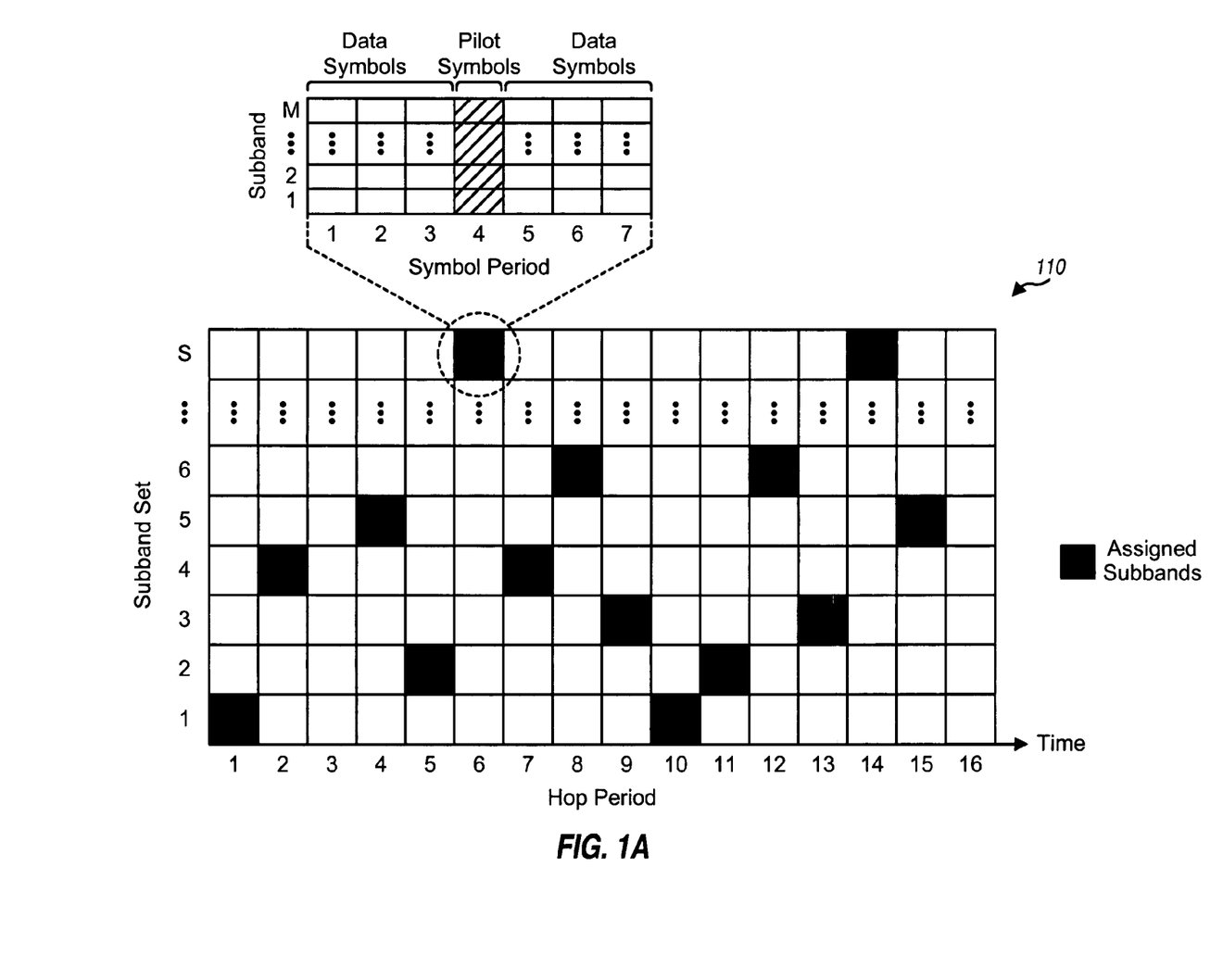
FIGS. 1A and 1B show two exemplary transmission schemes.

FIG. 1A illustrates a frequency hopping (FH) transmission scheme 110 that may be used for an OFDM-based system. Frequency hopping can provide frequency diversity against deleterious path effects and randomization of interference. With frequency hopping, each terminal (or user) may be assigned a different FH sequence that indicates the particular subband(s) to use in each "hop" period. Each FH sequence may be a pseudo-random sequence that randomly selects subbands for the assigned terminal. The FH sequences for different terminals in communication with the same base station are orthogonal to one another so that no two terminals use the same subband in any given hop period. This avoids ("intra-sector") interference among the terminals communicating with the same base station. The FH sequences for each base station are pseudo-random with respect to the FH sequences for nearby base stations. Interference between two terminals communicating with two different base stations occurs whenever the FH sequences for these terminals select the same subband in the same hop period. However, this ("inter-sector") interference is randomized due to the pseudo-random nature of the FH sequences.

As shown in FIG. 1A, each hop period may span multiple symbol periods. Each terminal may be assigned a set of M subbands in each hop period, where M may be greater than one. Data symbols (which are modulation symbols for data) may be time division multiplexed (TDM) with pilot symbols (which are modulation symbols for pilot). The M subbands may be contiguous (as shown in FIG. 1A) or non-contiguous (e.g., uniformly spaced apart by S subbands). Transmission scheme 110 may be used, for example, for the reverse link of an OFDMA system.

Figure 1B:
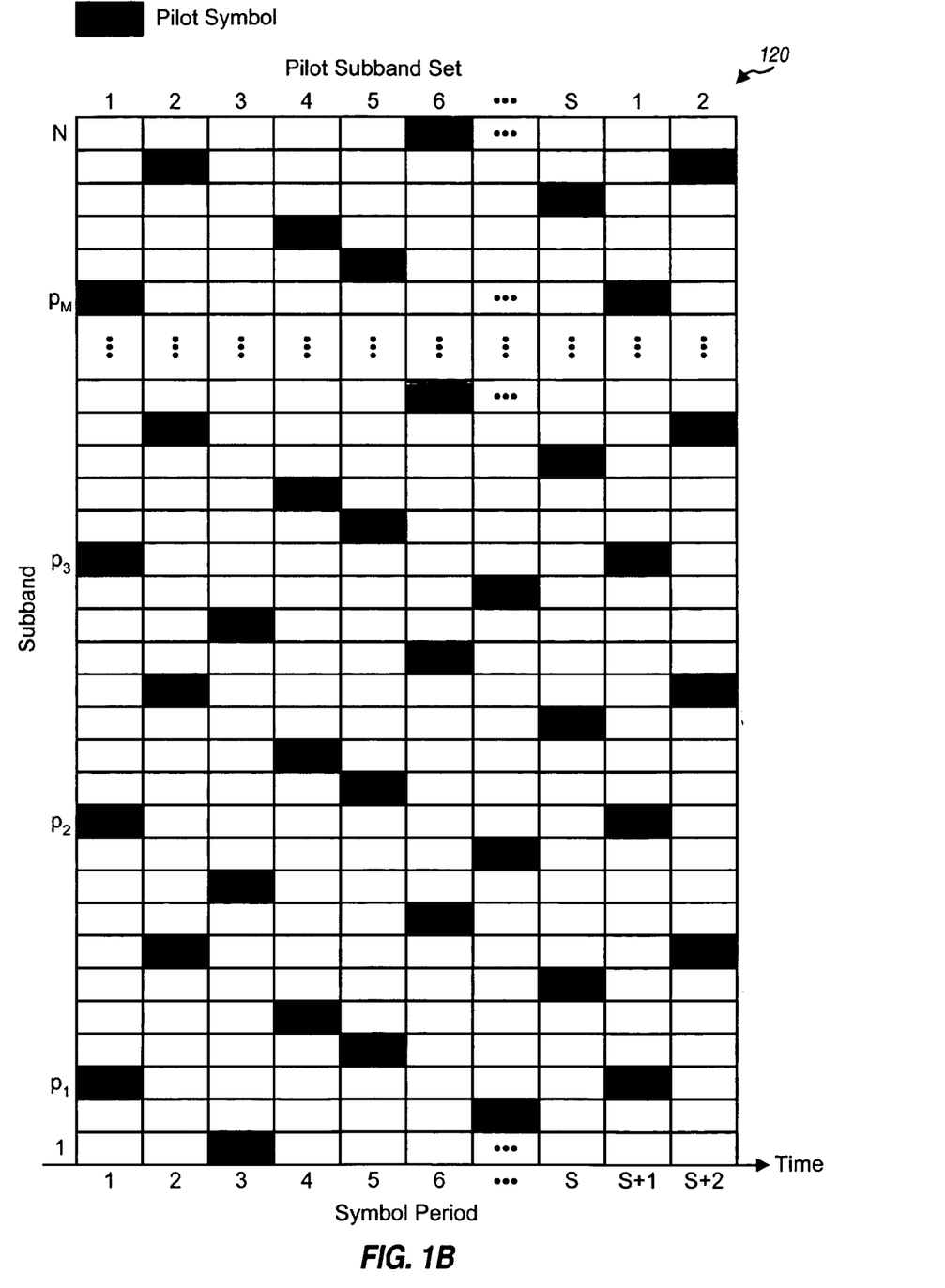

FIG. 1B shows an "interlaced" transmission scheme 120 that may also be used for an OFDM-based system. For the example shown in FIG. 1B, S different sets of pilot subbands are formed, with each set containing M=N/S subbands used for pilot transmission (or "pilot subbands"). To improve performance, the pilot subbands in each set may be uniformly spaced apart by S subbands, and the S pilot subband sets may be interlaced as shown in FIG. 1B. Data symbols may be sent on other subbands not used for pilot transmission. In general, any number of pilot subband sets may be formed, and each set may contain any number of subbands. Transmission scheme 120 may be used, for example, for the forward link of an OFDMA system.

The channel estimation techniques described herein may be used in conjunction with various transmission schemes. These techniques may be used for a narrowband pilot that may be transmitted as shown in FIG. 1A or 1B or in some other manner. These techniques may also be used for a wideband pilot that may be transmitted on all or a large number of the N total subbands in a TDM manner with data.

A wireless channel in an OFDM-based system may be characterized by either a time-domain channel impulse response or a corresponding frequency-domain channel frequency response. As used herein, and which is consistent with conventional terminology, a "channel impulse response" is a time-domain response of the channel, and a "channel frequency response" is a frequency-domain response of the channel. In a sampled-data system, the channel frequency response is a discrete Fourier transform (DFT) of the channel impulse response. For clarity, in the following description, a channel impulse response is composed of a sequence of "channel taps", with each channel tap being defined by a channel tap gain (or simply, "tap gain") and a channel tap delay (or simply, "tap delay"). A channel frequency response is composed of a set of "channel gains", with each channel gain being for a specific subband.

Figure 2:
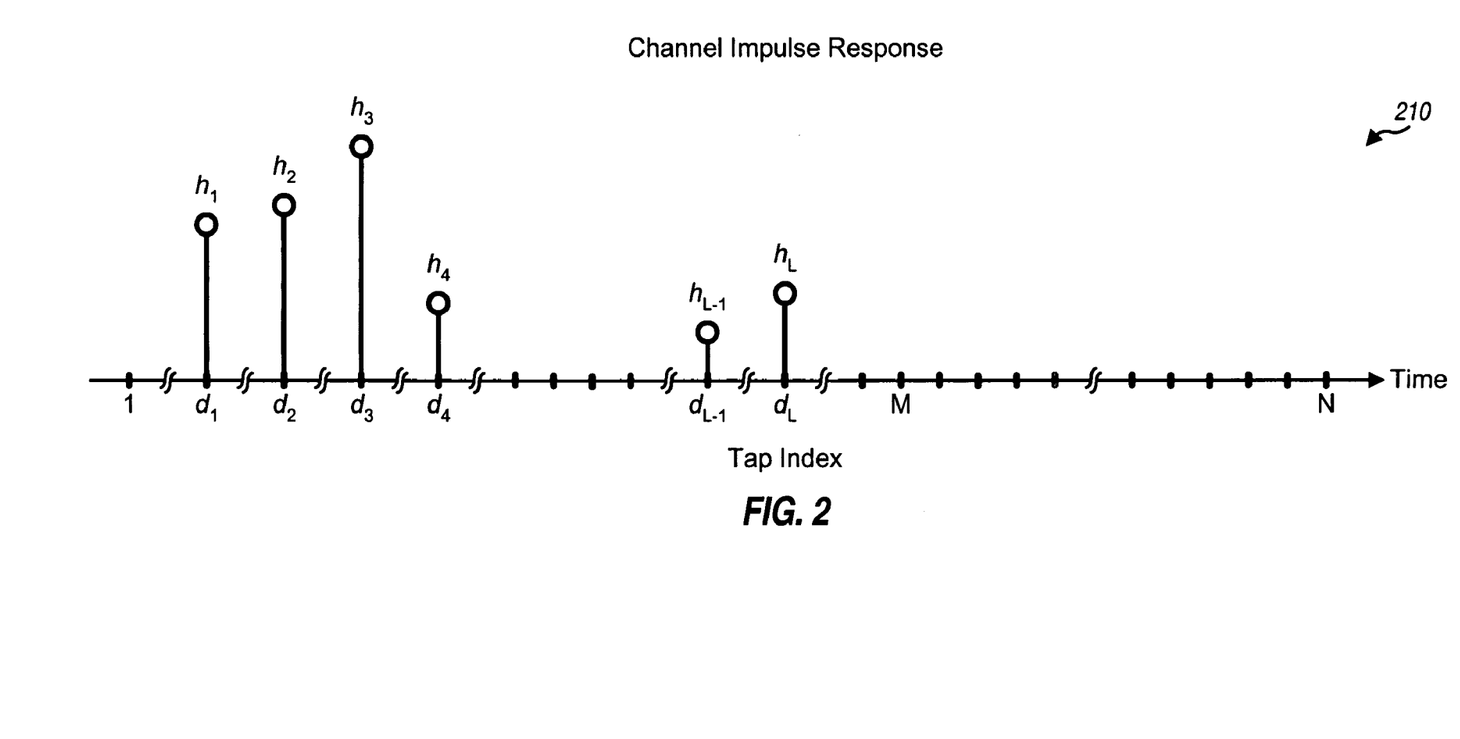
FIG. 2 shows an impulse response of a wireless channel.

FIG. 2 shows an impulse response 210 of a wireless channel. Channel impulse response 210 includes L channel taps of interest (e.g., of sufficient strength). Each channel tap has a complex gain of $h_i$ and is located at a delay of $d_i$. In general, each channel tap may be located anywhere between 1 and N (or $1 \leq d_i \leq N$), where N is also the time span or length of the wireless channel. The L tap gains are denoted as $\{h_i\}$, or $h_i$ for $i=1, 2, \ldots L$. The L tap delays are denoted as $\{d_i\}$, or $d_i$ for $i=1, 2, \ldots L$. The tap gains $\{h_i\}$ are correlated random variables that vary at a rate determined by the Doppler spread of the wireless channel. The L tap gains $\{h_i\}$ as well as the L tap delays $\{d_i\}$ are unknown and may be estimated as described below.

The channel impulse response may be represented in the z-domain by an L-tap finite impulse response (FIR) filter, H(z), as follows:

$$H(z) = \sum_{i=1}^{L} h_i \cdot z^{-d_i}, \qquad \text{Eq (1)}$$

where $z^{-1}$ denotes a delay of one sample (or chip) period and $z^{-d_i}$ denotes the delay of the i-th channel tap. The channel impulse response may also be represented by an L×1 vector $\underline{h}$, without explicit reference to tap delays $\{d_i\}$, as follows:

$$\underline{h} = [h_1\ h_2 \ldots h_L]^T, \qquad \text{Eq (2)}$$

where "$T$" denotes a transpose.

A channel profile may be defined as follows:

$$\underline{P} = \text{diag}\langle \underline{h} \cdot \underline{h}^T \rangle \qquad \text{Eq (3)}$$

where $\langle\ \rangle$ denotes a time-averaging operation;
diag $\{\underline{M}\}$ is a diagonal matrix with just the diagonal elements of a matrix $\underline{M}$; and
$\underline{P}$ is an L×L diagonal matrix for the channel profile.

A diagonal matrix contains possible non-zero values along the diagonal and zeros elsewhere. The diagonal elements of $\underline{P}$ represent a channel profile defined by $\underline{h}$. The channel profile is indicative of the long-term time-averaged energy of the channel taps in the channel impulse response. The channel profile does not include short-term effects such as fading, Doppler, and so on. The channel profile is thus indicative of the reflectivity/transmissivity of a medium via which a signal may travel.

A frequency-domain channel gain may be estimated for each subband used for pilot transmission, as follows:

$$H_k = \frac{y_k}{p_k}, \text{ for } k = 1, 2, \ldots M, \quad \text{Eq (4)}$$

where $y_k$ is a received pilot symbol for subband k;
$p_k$ is a pilot symbol transmitted on subband k; and
$H_k$ is a channel gain estimate for subband k.

M channel gains $\{H_k\}$ for M subbands used for pilot transmission may be estimated based on pilot symbols received on these subbands, as shown in equation (4). The channel gains are frequency-domain values. Each channel gain may be expressed as a Fourier transform of the L (unknown) time-domain channel taps, as follows:

$$H_k = \sum_{i=1}^{L} (h_i \cdot e^{j2\pi \cdot d_i(k-1)/N} + n_i)$$

$$= \sum_{i=1}^{L} (h_i \cdot e^{j\omega_i(k-1)} + n_i), \quad \text{Eq (5)}$$

$$\text{for } k = 1, 2, \ldots M,$$

where $\omega_i = 2\pi d_i/N$ is an angular frequency (in radians) for the i-th channel tap; and
$n_i$ is the noise for the i-th channel tap.

The angular frequencies, $\omega_i$ for i=1, 2, . . . L, are frequency components of the channel gains $\{H_k\}$ and are directly related to the unknown tap delays for the impulse response of the wireless channel. The tap delays may thus be estimated by performing spectral (or tone) estimation on the channel gains $\{H_k\}$, as described below.

Equation (5) may be expressed in matrix form, as follows:

$$\underline{H} = \begin{bmatrix} H_1 \\ H_2 \\ H_3 \\ \vdots \\ H_M \end{bmatrix} = \begin{bmatrix} 1 & 1 & \cdots & 1 \\ e^{j\omega_1} & e^{j\omega_2} & \cdots & e^{j\omega_L} \\ e^{j2\omega_1} & e^{j2\omega_2} & \cdots & e^{j\omega_L} \\ \vdots & \vdots & \ddots & \vdots \\ e^{j(M-1)\omega_1} & e^{j(M-1)\omega_2} & \cdots & e^{j(M-1)\omega_L} \end{bmatrix} \cdot \begin{bmatrix} h_1 \\ h_2 \\ h_3 \\ \vdots \\ h_L \end{bmatrix} + \begin{bmatrix} n_1 \\ n_2 \\ n_3 \\ \vdots \\ n_L \end{bmatrix}, \text{ or} \quad \text{Eq (6)}$$

$$\underline{H} = \underline{Q}\underline{h} + \underline{n}, \quad \text{Eq (7)}$$

where $\underline{Q}$ is an M×L "Fourier-type" matrix containing the elements shown in equation (6) and $\underline{n}$ is an L×1 noise vector.

The pilot may be transmitted on different sets of M subbands in different time intervals (e.g., as shown in FIG. 1A or 1B). For example, the pilot may be sent on subbands k=1, 2, . . . M in one time interval, then subbands k=1+b, 2+b, . . . M+b in the next time interval, and so on, where b may be any arbitrary offset value. The channel gains for the pilot sent on subbands k=1+b, 2+b, . . . M+b may be expressed as:

$$\underline{H}_b = \underline{QB}\underline{h} + \underline{n}, \quad \text{Eq (8)}$$

where $\underline{B}$ is an L×L diagonal matrix given by $\underline{B} = \text{diag}(e^{jb\omega_1}, e^{jb\omega_2}, \ldots e^{jb\omega_L})$.

An M×M correlation (or outer product) matrix of $\underline{H}$ may be defined as $\underline{H} \cdot \underline{H}^H$, where "$^H$" denotes a conjugate transpose. A long-term time-average of the correlation matrix of $\underline{H}$, denoted as $\underline{R}$, may be expressed as:

$$\underline{R} = \langle \underline{H} \cdot \underline{H}^H \rangle = \underline{Q} \cdot \underline{P} \cdot \underline{Q}^H + \sigma^2 \cdot \underline{I}. \quad \text{Eq (9)}$$

Equation (9) is obtained based on equations (3), (7), and (8). The b offset values may be appropriately selected (e.g., in a pseudo-random manner as shown in FIG. 1A or a deterministic manner as shown in FIG. 1B) such that the $\underline{B}$ matrices for an ensemble of different offset values average to zero. In this case, if a sufficient amount of averaging is performed on the correction matrices obtained for different time intervals, then the $\underline{B}$ matrices cancel out and do not appear in $\underline{R}$. Equation (9) also assumes that the channel noise is additive white Gaussian noise (AWGN) with zero mean, a variance of $\sigma^2$, and an autocovariance matrix of $\underline{\Phi}_{nn} = \sigma^2 \cdot \underline{I}$, where $\underline{I}$ is an identity matrix with ones along and diagonal and zeros elsewhere.

Eigenvalue decomposition may be performed on the matrix $\underline{R}$ as follows:

$$\underline{R} = \underline{V} \cdot \underline{D} \cdot \underline{V}^H \quad \text{Eq (10)}$$

where $\underline{V}$ is an M×M unitary matrix of eigenvectors of $\underline{R}$; and
$\underline{D}$ is an M×M diagonal matrix of eigenvalues of $\underline{R}$.

A unitary matrix $\underline{M}$ is characterized by the property $\underline{M}^H \underline{M} = \underline{I}$. The columns of a unitary matrix are orthogonal to one another, and each column has unity power. Eigenvalue decomposition is described by Gilbert Strang in a book entitled "Linear Algebra and Its Applications," Second Edition, Academic Press, 1980.

The M diagonal elements of $\underline{D}$ are referred to as eigenvalues of $\underline{R}$. The M columns of $\underline{V}$ are referred to as eigenvectors of $\underline{R}$. Each column of $\underline{V}$ corresponds to one eigenvalue in $\underline{D}$. Thus, the first or leftmost column of $\underline{V}$ corresponds to the diagonal element in the first column of $\underline{D}$, the second column of $\underline{V}$ corresponds to the diagonal element in the second column of $\underline{D}$, and so on.

The M eigenvalues in $\underline{D}$ may be ordered from smallest to largest and denoted as $\{\lambda_1, \lambda_2, \ldots \lambda_M\}$ after the ordering, where $\lambda_1$ is the smallest eigenvalue and $\lambda_M$ is the largest eigenvalue. When the eigenvalues in $\underline{D}$ are ordered, the eigenvectors in $\underline{V}$ are ordered correspondingly. The M−L smallest eigenvalues in $\underline{D}$ (i.e., $\lambda_1$ through $\lambda_{M-L}$) are equal to the noise variance $\sigma^2$ and are referred to as "noise" eigenvalues. The M−L eigenvectors in $\underline{V}$ corresponding to the M−L noise eigenvalues (i.e., the M−L leftmost columns of $\underline{V}$ after the ordering) are referred to as "noise" eigenvectors of $\underline{R}$ and are denoted as $\{r_1, r_2, \ldots r_{M-L}\}$. The noise eigenvectors are orthogonal to the columns of $\underline{Q}$.

The L tap gains/power are contained in the matrix $\underline{P}$ and the L tap delays are contained in the matrix $\underline{Q}$. Each of the L columns of $\underline{Q}$ has the following form:

$$\underline{q}_l = [1, e^{j2\pi(l-1)/N}, e^{j2\pi(l-1)/N}, \ldots e^{j2\pi(M-1)(l-1)/N}], \quad \text{Eq(11)}$$

where l is an index representing an unknown tap delay and is within a range of 1 through N, or $l \in \{1, 2, \ldots N\}$.

A cost function may be defined as follows:

$$C(l) = \frac{1}{\sum_{k=1}^{M-L} |\underline{q}_l^H \cdot \underline{r}_k|^2}, \text{ for } l = 1, 2, \ldots N. \quad \text{Eq (12)}$$

The L unknown tap delays may be obtained based on the cost function C(l), as follows. The cost function is evaluated for each of the N possible values of l, i.e., for l=1, 2, . . . N. Each value of l represents a hypothesized delay value for a channel tap. For each value of l, the vector $\underline{q}_l$ is first determined as shown in equation (11) and multiplied with each of the M−L noise eigenvectors to obtain M−L inner products, $\underline{g}_k = \underline{q}_l^H \cdot \underline{r}_k$ for k=1, 2, . . . M−L. The power of each inner product is computed as $|g_k|^2 = g_k \cdot g_k^*$, where "*" denotes a complex conjugate. The powers of the M−L inner products are then summed, and the inverse of the summed power is provided as a cost value $C_l$ for this value of l. N cost values, $C_l$ for l=1, 2, . . . N, are obtained for N possible values of l.

Since the columns of $\underline{Q}$ are orthogonal to the noise eigenvectors, the inner product of any column of $\underline{Q}$ with any noise eigenvector is small or zero. Consequently, the summed power of the M−L inner products for each column of $\underline{Q}$ is small, and the inverse of this summed power is large. The L largest values among the N cost values are then identified. The L values of l corresponding to these L largest cost values represent the L unknown tap delays for the channel impulse response. These L identified values of l may be used to form the matrix $\underline{Q}$. The L tap gains may then be derived as follows:

$$\underline{h}_b = \underline{B}^{-1} \underline{Q}^{-1} \underline{H}_b, \quad \text{Eq (13)}$$

where $\underline{H}_b$ is an M×1 vector for the frequency response estimate for one set of M pilot subbands; and $\underline{h}_b$ is an L×1 vector for a channel impulse response estimate with L taps.

An impulse response estimate $\underline{h}_b$ may be obtained for the frequency response estimate $\underline{H}_b$ for each set of pilot subbands. The impulse response estimates for different sets of pilot subbands may be averaged to obtain an averaged impulse response estimate with L taps (denoted by a vector $\underline{h}_L$).

A "full" channel impulse response estimate with N taps (denoted by a vector $\underline{h}_N$) may be formed based on the averaged channel impulse response estimate with L taps, $\underline{h}_L$. The N×1 vector $\underline{h}_N$ would contain all L elements of the L×1 vector $\underline{h}_L$ at the proper tap indices (which are determined by the L values of l corresponding to the L largest cost values) and N−L zeros at all other tap indices. A "full" channel frequency response estimate for all N subbands (denoted by a vector $\underline{H}_N$) may be obtained by performing an N-point fast Fourier transform (FFT) on the full channel impulse response estimate, $\underline{h}_N$, as follows:

$$\underline{H}_N = \underline{W} \cdot \underline{h}_N, \quad \text{Eq(14)}$$

where $\underline{W}$ is an N×N Fourier matrix defined such that the (i,j)-th entry, $w_{i,j}$, is given as:

$$w_{i,j} = e^{-j2\pi\frac{(i-1)(j-1)}{N}}, \quad \text{Eq (15)}$$

for $i = 1, 2, \ldots N$ and $j = 1, 2, \ldots N$, where i is a row index and j is a column index. The full channel frequency response estimate, $\underline{H}_N$, may be used for matched filtering, equalization, and so on, of a data transmission received via the wireless channel.

In the above description, L denotes the number of channel taps to be estimated. In general, L may or may not be equal to the number of channel taps ($L_{act}$) in the actual impulse response of the wireless channel. If $L=L_{act}<M$, then the $L_{act}$ channel taps may be estimated as described above. If $L \neq L_{act}$ and L<M, then L channel taps representative of a channel profile for the wireless channel may be obtained as described above. If L=1, then a single channel tap situated at the center of the channel profile (which is $L_{act}$ long) may be obtained, so long as M is greater than one. The tap delay corresponding to this single channel tap (denoted as $d_s$) may be used as an estimate of the arrival time of a signal transmitted via the wireless channel. In general, as M increases, more channel taps with good accuracy and high resolution may be estimated. For a wideband pilot with M being equal to or approaching N, a full channel impulse response with up to N taps may be estimated based on the wideband pilot.

The techniques described herein may be used to obtain an improved channel estimate. As used herein, a "channel estimate" may include any type and any combination of information for a wireless channel. For example, a channel estimate may comprise a channel profile, a set of channel gains for a frequency response estimate, a sequence of channel taps for an impulse response estimate, a single channel tap, an arrival time for a signal transmitted via the wireless channel, and/or some other pertinent information for the wireless channel.

Figure 3:
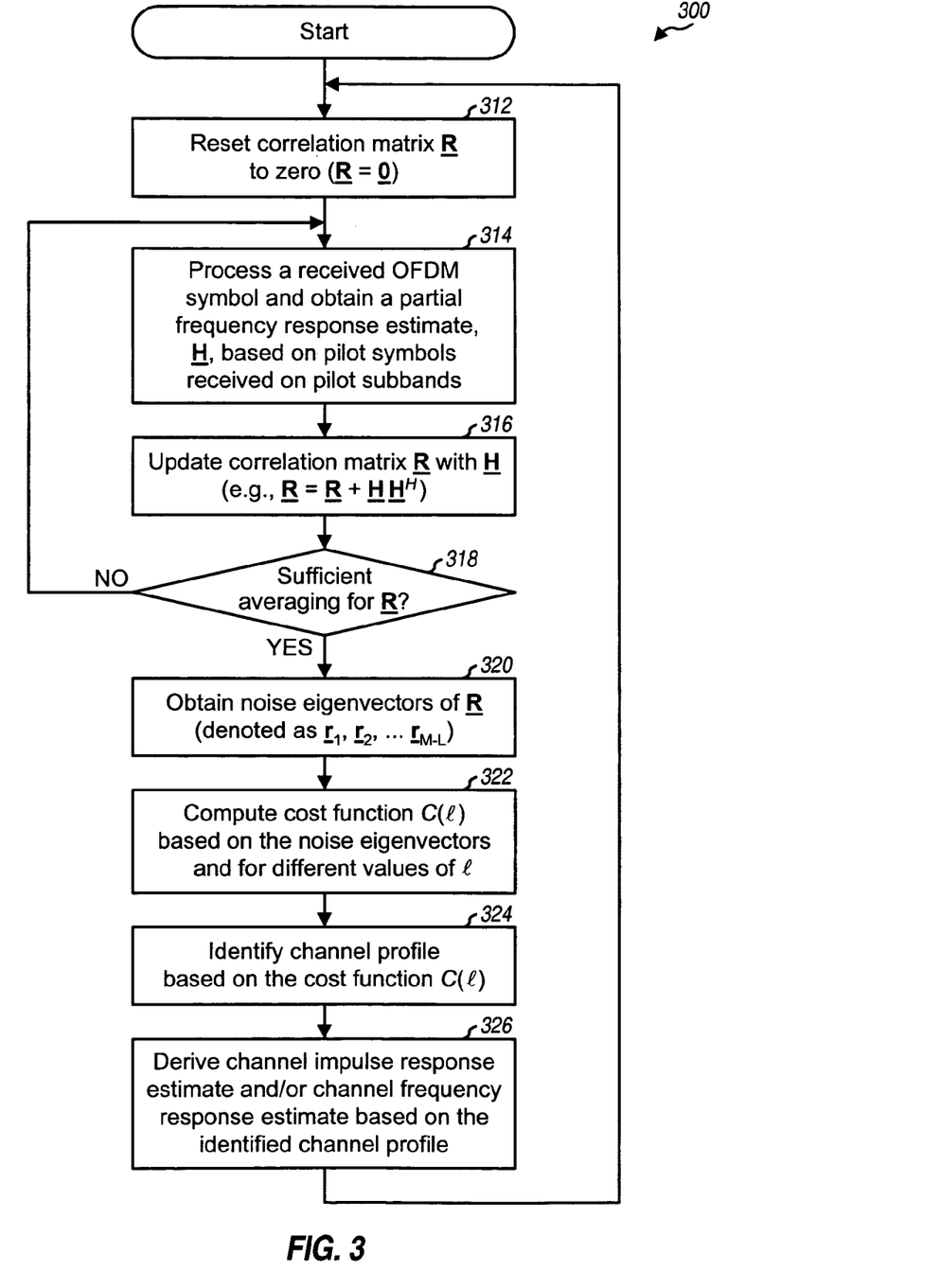
FIG. 3 shows a specific process for performing channel estimation.

FIG. 3 shows a flow diagram of a process 300 for performing channel estimation. The time-averaged correlation matrix $\underline{R}$ is initially set to zero (block 312). A received OFDM symbol is obtained from the wireless channel and processed (e.g., OFDM demodulated) to obtain M received pilot symbols for M pilot subbands (block 314). Different sets of subbands may be used to transmit the pilot in different symbol periods, as shown in FIGS. 1A and 1B. For a narrowband pilot, the received pilot symbols are used to obtain a partial frequency response estimate (denoted by vector $\underline{H}$), as shown in equation (4) (also block 314). The matrix $\underline{R}$ is then updated based on the vector $\underline{H}$ (block 316), as follows:

$$\underline{R}_{m+1} = \underline{R}_m + \underline{H} \cdot \underline{H}^H, \quad \text{Eq (16)}$$

where $\underline{R}_m$ is the correlation matrix for the m-th update interval.

A determination is then made whether the matrix $\underline{R}$ has been averaged over a sufficient number of OFDM symbols with pilot (block 318). If the answer is 'no', then the process returns to block 312 to receive and process another OFDM symbol with pilot. Otherwise, noise eigenvectors of the matrix $\underline{R}$ are obtained as described above (block 320). The cost function C(l) is then computed based on the noise eigenvectors and for N possible values of l, e.g., as shown in equation (12) (block 322). The channel profile is then identified based on the cost values obtained for the cost function C(l), as described above (block 324). A channel estimate may then be derived based on the identified channel profile (block 326). For example, a channel impulse response estimate may be obtained as shown in equation (13), and a channel frequency response estimate may be obtained as shown in equation (14). The process then returns to block 312 to obtain another channel estimate.

Channel estimates may also be obtained based on a running average of the matrix $\underline{R}$. For example, the matrix $\underline{R}$ may be updated in block 316 based on an infinite impulse response (IIR) filter, as follows:

$$\underline{R}_{m+1} = \alpha \cdot \underline{R}_m + (1-\alpha) \cdot \underline{H} \cdot \underline{H}^H, \qquad \text{(Eq17)}$$

where $\alpha$ is a coefficient that determines the amount of averaging. A larger value for $\alpha$ corresponds to more averaging. Process 300 may then be modified to transition from block 326 to block 314 (instead of block 312). An updated channel profile and channel estimate may then be obtained, e.g., whenever an OFDM symbol with pilot is received.

The channel estimation as described above is based on recognition that the unknown tap delays ($d_i$ for i=1, 2, ... L) to be ascertained are unknown frequency components ($\omega_i$ for i=1, 2, ... L) of the available frequency-domain channel gains. Spectral estimation (or spectral analysis) is then used to determine the unknown frequency components of the channel gains. These frequency components, once determined, serve as estimates of the unknown tap delays for a channel impulse response estimate.

For clarity, a specific spectral estimation technique, which is often referred to as a multiple signal classification (MUSIC) technique, is described above. Other spectral estimation techniques may also be used to ascertain the frequency components of the frequency response estimate (and thus the tap delays for the impulse response estimate), and this is within the scope of the invention. For example, the spectral estimation may be performed based on a periodogram technique, a Prony estimator, a Pisarenko harmonic decomposition technique, and so on. These various spectral estimation techniques, including the MUSIC technique, are described by S. L. Marple Jr. in "A Tutorial Overview of Modem Spectral Estimation," Proc. IEEE, 1989, pp. 2152-2157, and by B. D. Kao and K. S. Arun in "Model Based Processing of Signals: A State Space Approach," Proc. IEEE, Vol. 80, No. 2, February 1992, pp. 283-309.

Figure 4:
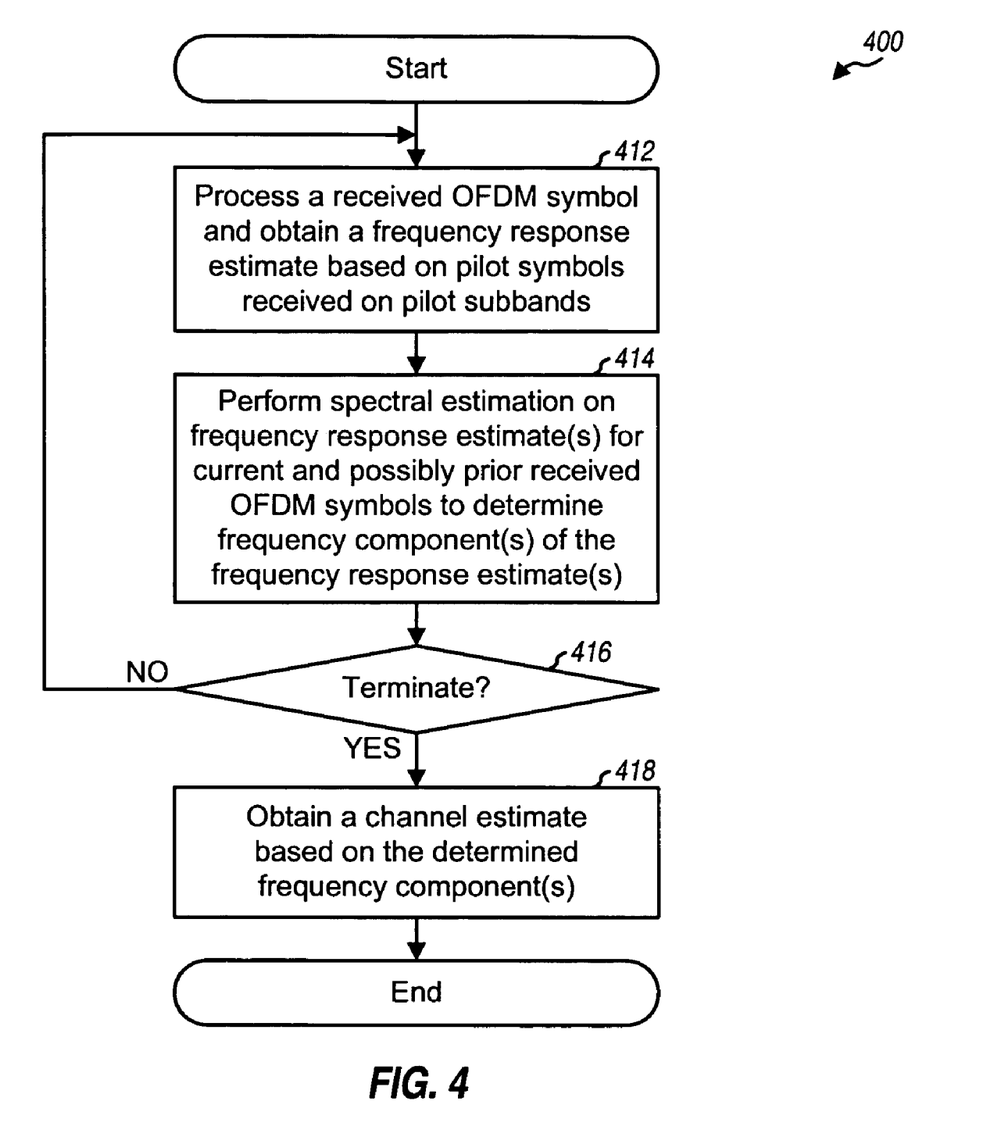
FIG. 4 shows a process for performing channel estimation using spectral estimation.

FIG. 4 shows a flow diagram of a process 400 for performing channel estimation using spectral estimation. A received OFDM symbol is obtained from a communication channel and processed to obtain a partial or full frequency response estimate (block 412). The communication channel may be a wireless channel or a wireline channel. For a narrowband pilot, a partial frequency response estimate may be obtained for a small subset of the N total subbands in each OFDM symbol with pilot. For a wideband pilot, a full frequency response estimate may be obtained for all or a large number of the N total subbands in each OFDM symbol with pilot.

Spectral estimation is then performed on the frequency response estimate for the current received OFDM symbol and possibly frequency response estimates for prior received OFDM symbols to determine one or more frequency components of the frequency response estimate(s) (block 414). The spectral estimation may be based on the MUSIC, periodogram, Prony estimator, Pisarenko harmonic decomposition, or some other technique. Each spectral estimation technique typically employs some type of averaging to obtain a good estimate of the frequency component(s) being sought. A determination is then made whether to terminate the spectral estimation (block 416). The spectral estimation may be terminated based on various criteria such as, for example, after a predetermined number of OFDM symbols with pilot have been processed, if a computed error criterion is below a predetermined threshold, and so on. The termination criterion may be dependent on the spectral estimation technique selected for use. If the spectral estimation is to continue, as determined in block 416, then the process returns to block 412 to process another OFDM symbol with pilot. Otherwise, a channel estimate is obtained based on the frequency component(s) determined by the spectral estimation (block 418). For example, the channel estimate may include L channel taps and/or L tap delays for a channel impulse response estimate, where $L \geq 1$, channel gains for a channel frequency response estimate, the signal arrival time, the channel profile, and so on.

The techniques described herein may be used to obtain a channel estimate with good resolution even if the pilot is transmitted such that only a small portion of the system bandwidth is observable at any given time. If the pilot is sent on only M subbands at a time, where M may be much less than N, then a receiver can only observe the wireless channel over a relatively narrow band based on the pilot received on these M subbands. Consequently, a delay resolution of 1/M may be obtained based on the narrowband pilot for each set of M subbands, where 1/M is much more coarse than 1/N if M is much less than N. The techniques described herein can provide channel taps with a delay resolution of 1/N, which may be much better resolution than that possible with any one narrowband pilot transmission.

The techniques described herein may also be used to deal with excess delay spread. An OFDM-based system can withstand a delay spread that is smaller than or equal to the cyclic prefix length. The delay spread of a wireless channel is the time span (or duration) of the impulse response for the wireless channel, which is $d_{last} - d_1$, where $d_1$ is the earliest channel tap and $d_{last}$ is the latest channel tap. If the delay spread is less than or equal to the cyclic prefix length, then the N subbands are orthogonal to one another. Excess delay spread occurs if the delay spread is greater than the cyclic prefix length. In this case, channel taps with delays greater than C (i.e., the "excess" portion of the channel impulse response) can cause various deleterious effects such as ISI and channel estimation errors, both of which can degrade system performance. Using the techniques described herein, the tap delays may be ascertained, and the excess portion of the channel impulse response may be identified. This knowledge of the presence of excess delay spread may be used to optimize a receiver "on the fly" for better performance. For example, the receiver may perform channel estimation based on pilot symbols received on multiple sets of subbands (instead of each set of subbands) in order to obtain a longer impulse response estimate that can capture the excess portion, as described in commonly assigned U.S. patent application Ser. No. 10/821,7060, entitled "Pilot Transmission and Channel Estimation for an OFDM System With Excess Delay Spread," filed xxx.

The techniques described herein may also be used by a receiver to achieve time-synchronization, which entails determining the time of arrival of a signal at the receiver. The receiver typically does not know a priori the arrival time of the signal because a transmitter may transmit at an arbitrary time instant and the wireless channel may introduce an unknown delay. The resolution to which the arrival time of the signal can be determined is limited by the bandwidth of the channel observations. Thus, only a coarse arrival time may be estimated based on the pilot received on any one set of M subbands, if M is much less than N. The techniques described herein can provide a more accurate arrival time of the signal transmitted via the wireless channel (as described above, with L=1). Accurate information on the time at which the signal is received is important since much of the receiver processing (e.g., demodulation and decoding) is typically performed based on this information.

Figure 5:
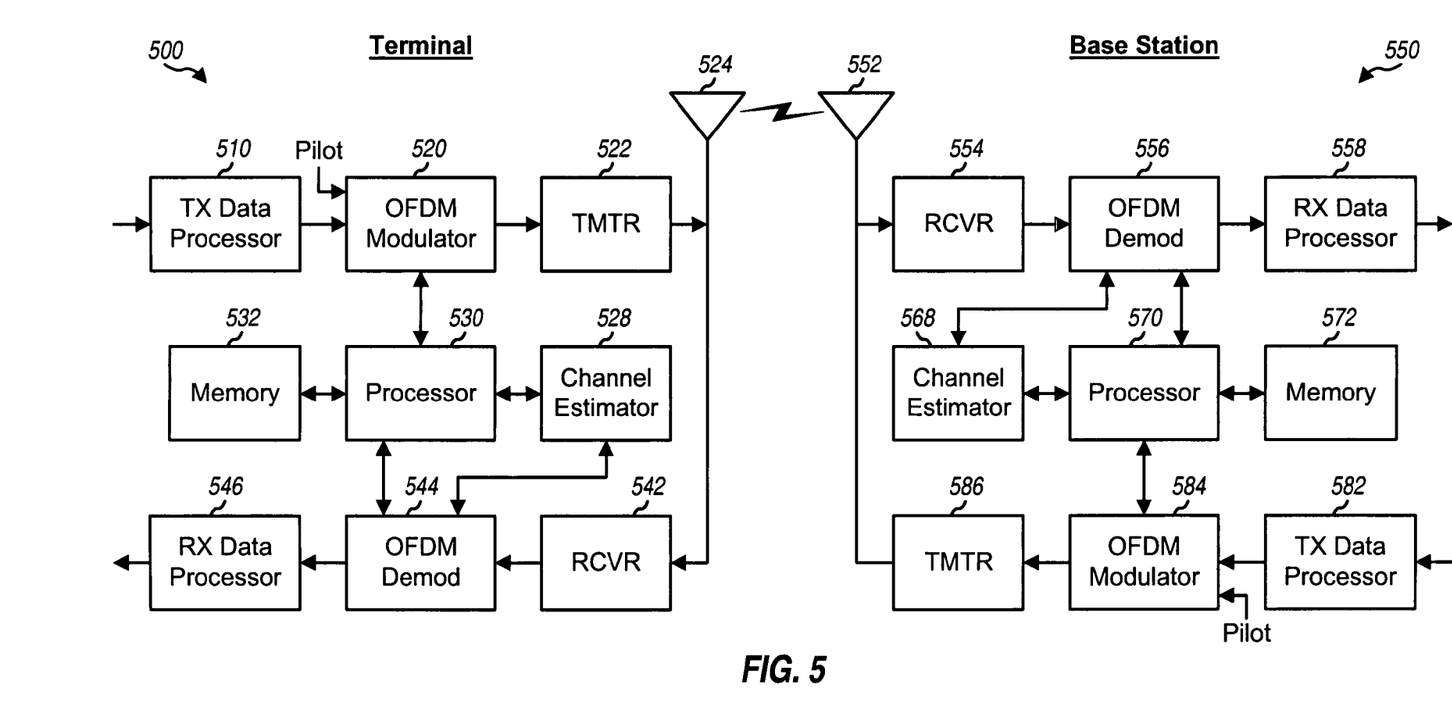
FIG. 5 shows a block diagram of a terminal and a base station.

FIG. 5 shows a block diagram of a terminal 500 and a base station 550 in an OFDM-based system (e.g., an OFDMA system). On the reverse link, at terminal 500, a transmit (TX) data processor 510 receives, formats, codes, interleaves, and modulates (i.e., symbol maps) traffic and control data and provides modulation symbols (or data symbols). An OFDM modulator 520 receives the data symbols and pilot symbols, performs OFDM modulation as described above, and provides a stream of OFDM symbols. The pilot and data symbols may be transmitted in various manners (e.g., as shown in FIG. 1A or 1B). For an OFDMA system, the data and pilot symbols may be transmitted on M subbands assigned to terminal 500 (e.g., as shown in FIG. 1A). A transmitter unit (TMTR) 522 receives and conditions (e.g., converts to analog, amplifies, filters, and frequency upconverts) the stream of OFDM symbols to generate a reverse link signal, which is transmitted via an antenna 524 to base station 550.

At base station 550, an antenna 552 receives the reverse link signal and provides a received signal to a receiver unit (RCVR) 554. Receiver unit 554 conditions (e.g., filters, amplifies, and frequency downconverts) the received signal, digitizes the conditioned signal, and provides received chips to an OFDM demodulator 556.

Figure 6:
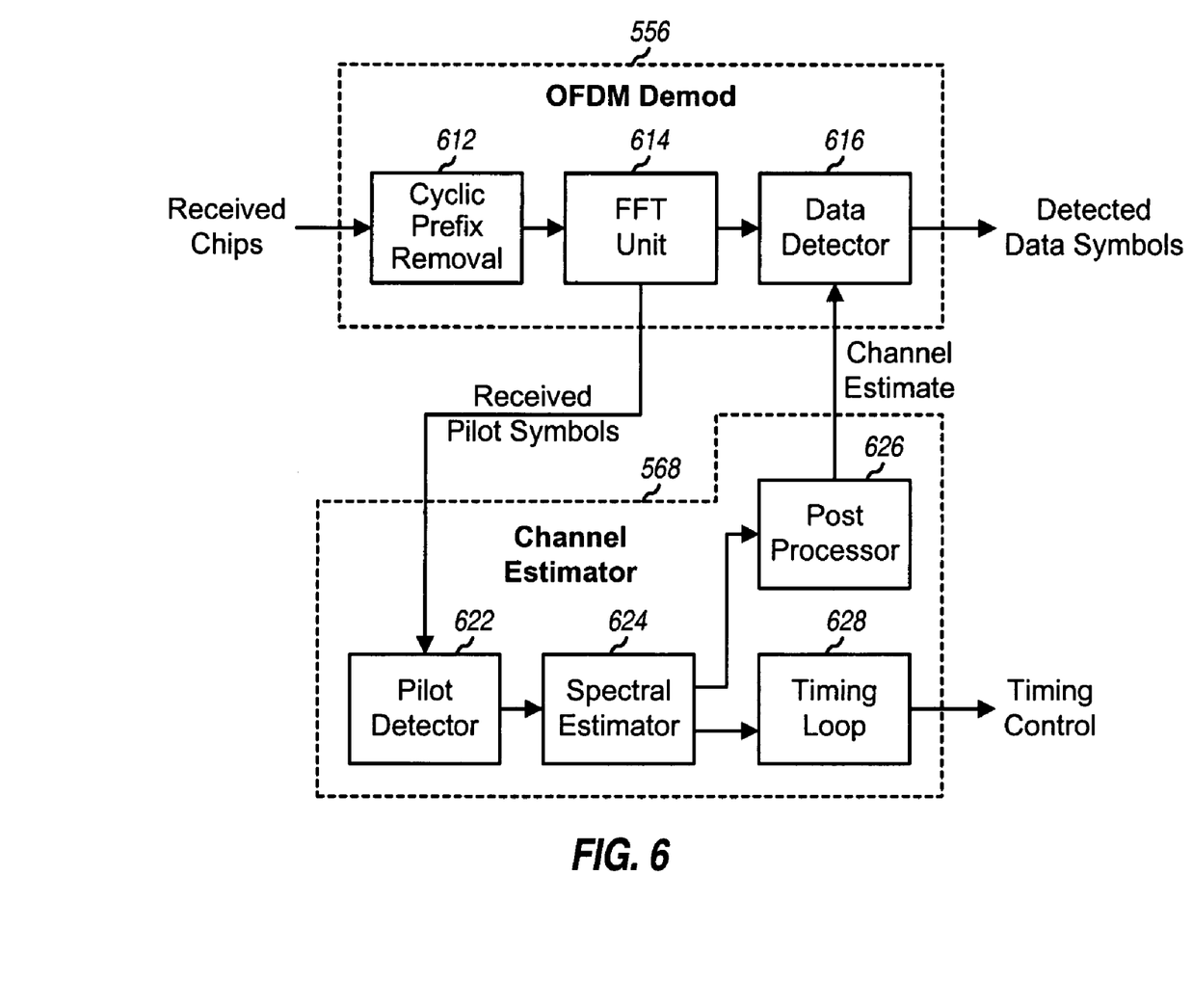
FIG. 6 shows an OFDM demodulator and a channel estimator.

FIG. 6 shows an embodiment of OFDM demodulator 556 and channel estimator 568. Within OFDM demodulator 556, a cyclic prefix removal unit 612 removes the cyclic prefix appended to each OFDM symbol. An FFT unit 614 then transforms each received transformed symbol to the frequency domain using an N-point FFT and obtains N received symbols for the N subbands. FFT unit 614 provides received pilot symbols to a channel estimator 568 and received data symbols to a data detector 616. Data detector 616 further receives a frequency response estimate for the reverse link from channel estimator 568, performs detection (e.g., matched filtering or equalization) on the received data symbols with this frequency response estimate, and provides detected data symbols (which are estimates of the transmitted data symbols) to a receive (RX) data processor 558.

Channel estimator 568 obtains the received pilot symbols and performs channel estimation. Within channel estimator 568, a pilot detector 622 removes the modulation on the received pilot symbols to obtain a frequency response estimate for the reverse link for terminal 500. A spectral estimator 624 performs spectral estimation to obtain one or more frequency components of the frequency response estimate. Spectral estimator 624 may perform process 300 in FIG. 3 or may employ some other spectral estimation technique. A post processor 626 receives and uses the frequency component(s) from spectral estimator 624 to derive a channel estimate for the reverse link for terminal 500. Post processor 626 may derive a full channel impulse response estimate, a full channel frequency response estimate, and so on. For an OFDMA system, multiple terminals may transmit pilot concurrently on the reverse link on their assigned subbands. Channel estimator 568 would then obtain a frequency response estimate for each terminal based on pilot symbols received from the terminal, determines one or more frequency components of this frequency response estimate, and derives a channel estimate for the terminal.

A timing loop 628 receives a signal arrival time for terminal 550 from spectral estimator 624 and performs time-synchronization. For example, timing loop 628 may generate a timing control used to adjust the timing of the transmission sent by terminal 500 so that the transmission is properly time-aligned at base station 550. Time synchronization is important for a multiple-access system to ensure transmissions from multiple terminals do not or minimally interfere with one another at the base station. Alternatively or additionally, timing loop 628 may generate a control signal use to adjust the timing of OFDM demodulator 556. Timing loop 628 (which may implement, e.g., a single-order loop) may detect whether the transmission from terminal 500 is early or late with respect to a reference time and may generate an advance/retard control used to direct terminal 500 to advance or delay its timing so that its transmission arrives at the reference time at base station 550.

Referring back to FIG. 5, RX data processor 558 demodulates (i.e., symbol demaps), deinterleaves, and decodes the detected data symbols to recover the transmitted data. The processing by OFDM demodulator 556 and RX data processor 558 is complementary to the processing by OFDM modulator 520 and TX data processor 510, respectively, at terminal 500.

On the forward link, a TX data processor 582 processes traffic and control data and provides data symbols. An OFDM modulator 584 receives and multiplexes the data symbols with pilot symbols, performs OFDM modulation, and provides a stream of OFDM symbols. The same or different transmission schemes may be used for the forward and reverse links. For example, the transmission scheme shown in FIG. 1A may be used for the reverse link, and the transmission scheme shown in FIG. 1B may be used for the forward link. The same or different numbers of subbands may be used for pilot transmission on the forward and reverse links. In any case, a transmitter unit 586 receives and processes the stream of OFDM symbols to generate a forward link signal, which is transmitted via an antenna 552 to the terminal.

At terminal 500, the forward link signal from base station 550 is received by antenna 524 and processed by a receiver unit 542 to obtain received chips. An OFDM demodulator 544 then processes the received chips and provides received pilot symbols to a channel estimator 528 and detected data symbols to an RX data processor 546. Channel estimator 528 performs channel estimation for the forward link, e.g., using a spectral estimation technique such as the one shown in FIG. 3. Channel estimator 528 may also be implemented as shown in FIG. 6. RX data processor 546 processes the detected data symbols to recover the traffic data transmitted by base station 550.

Processors 530 and 570 direct the operation at terminal 500 and base station 550, respectively. Memory units 532 and 572 store program codes and data used by processors 530 and 570, respectively. Processors 530 and 570 may also implement channel estimators 528 and 568, respectively, and may perform channel estimation for the forward and reverse links, respectively.

The channel estimation techniques described herein may be implemented by various means. For example, these techniques may be implemented in hardware, software, or a combination thereof. For a hardware implementation, the processing units used to perform channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the channel estimation techniques may be implemented with modules (e.g., procedures, functions, and so on) that perform the functions described herein. The software codes may be stored in a memory unit (e.g., memory unit 532 or 572 in FIG. 5) and executed by a processor (e.g., controller 530 or 570). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing channel estimation for a communication channel in a communication system, comprising:
   obtaining a first channel estimate by a detector for the communication channel;
   performing spectral estimation on the first channel estimate to determine at least one frequency component of the first channel estimate; and
   obtaining a second channel estimate for the communication channel based on the determined at least one frequency component of the first channel estimate, wherein obtaining the second channel estimate comprises obtaining at least one channel tap delay for an impulse response estimate for the communication channel.

2. The method of claim 1, wherein obtaining the first channel estimate comprises determining a frequency response estimate for the communication channel, and wherein spectral estimation is performed on the frequency response estimate.

3. The method of claim 2, wherein each of the at least one frequency component is indicative of a delay for a channel tap in an impulse response estimate for the communication channel.

4. The method of claim 2, further comprising:
   obtaining a plurality of partial frequency response estimates for a plurality of different sets of subbands, wherein each partial frequency response estimate is for a portion of a total bandwidth for the system and is obtained from one set of subbands, and wherein the spectral estimation is performed on the plurality of partial frequency response estimates to determine the at least one frequency component.

5. The method of claim 4, wherein each set of subbands includes a subset of N total subbands for the system, where N is an integer greater than 1.

6. The method of claim 4, wherein each set of subbands includes M consecutive subbands in the system, where M is an integer greater than 1.

7. The method of claim 4, wherein each set of subbands includes M subbands uniformly distributed across N total subbands for the system, where M and N are integers greater than one, and M is less than N.

8. The method of claim 4, wherein the different sets of subbands are determined by a pseudo-random sequence used for frequency hopping.

9. The method of claim 2, wherein determining the frequency response estimate is obtained based on a wideband pilot and comprises channel gain estimates for all or a large number of subbands for the system.

10. The method of claim 1, wherein obtaining the second channel estimate further comprises obtaining at least one channel tap gain at the at least one channel tap delay.

11. The method of claim 1, wherein obtaining the second channel estimate comprises obtaining a plurality of channel gains for a plurality of subbands of the communication channel.

12. The method of claim 1, wherein obtaining the second channel estimate comprises obtaining a delay value indicative of an arrival time of a signal transmitted via the communication channel.

13. The method of claim 12, further comprising:
   using the delay value for time synchronization of a data transmission received via the communication channel.

14. The method of claim 1, wherein performing the spectral estimation comprises performing based on a multiple signal classification (MUSIC) technique.

15. The method of claim 1, wherein performing the spectral estimation comprises performing based on a periodogram technique, a Prony estimator, or a Pisarenko harmonic decomposition technique.

16. The method of claim 1, wherein the communication system utilizes orthogonal frequency division multiplexing (OFDM).

17. The method of claim 1, wherein the communication system is an orthogonal frequency division multiple access (OFDMA) system.

18. An apparatus operable to perform channel estimation for a communication channel in a communication system, comprising:
   a detector operative to obtain a first channel estimate for the communication channel;
   a spectral estimator operative to perform spectral estimation on the first channel estimate to determine at least one frequency component of the first channel estimate; and
   a processor operative to obtain a second channel estimate for the communication channel based on the determined at least one frequency component of the first channel estimate, wherein the second channel estimate comprises at least one channel tap delay for an impulse response estimate for the communication channel.

19. The apparatus of claim 18, wherein the first channel estimate comprises a frequency response estimate for the communication channel, and wherein each of the at least one frequency component is indicative of a delay for a channel tap in the impulse response estimate for the communication channel.

20. The apparatus of claim 18, wherein the detector is operative to obtain a plurality of partial frequency response estimates for a plurality of different sets of subbands, and wherein the spectral estimator is operative to perform spectral estimation on the plurality of partial frequency response estimates to determine the at least one frequency component.

21. The apparatus of claim 19, further comprising:
   a timing unit operative to obtain from the spectral estimator a delay value indicative of an arrival time of a signal transmitted via the communication channel and to use the delay value for time synchronization of a data transmission received via the communication channel.

22. An apparatus operable to perform channel estimation for a communication channel in a communication system, comprising:
   means for obtaining a first channel estimate for the communication channel;

means for performing spectral estimation on the first channel estimate to determine at least one frequency component of the first channel estimate; and means for obtaining a second channel estimate for the communication channel based on the determined at least one frequency component of the first channel estimate, wherein the second channel estimate comprises at least one channel tap delay for an impulse response estimate for the communication channel.

23. The apparatus of claim 22, wherein the first channel estimate comprises a frequency response estimate for the communication channel, and wherein each of the at least one frequency component is indicative of a delay for a channel tap in the impulse response estimate for the communication channel.

24. A method of performing channel estimation for a communication channel in a communication system, comprising:

obtaining a frequency response estimate by a detector for the communication channel;

deriving a correlation matrix based on the frequency response estimate;

obtaining T noise eigenvectors based on the correlation matrix, where T is an integer one of greater; and obtaining a channel estimate for the communication channel based on the T noise eigenvectors.

25. The method of claim 24, further comprising:

obtaining a plurality of partial frequency response estimates for a plurality of different sets of subbands, wherein each partial frequency response estimate is for a portion of a total bandwidth for the system and is obtained from one set of subbands, and wherein the frequency response estimate for the communication channel comprises the plurality of partial frequency response estimates.

26. The method of claim 25, wherein the deriving a correlation matrix comprises computing an outer product matrix for each of the plurality of partial frequency response estimates, and averaging a plurality of outer product matrices computed for the plurality of partial frequency response estimates to obtain the correlation matrix.

27. The method of claim 24, wherein the obtaining T noise eigenvectors comprises performing eigenvalue decomposition of the correlation matrix to obtain a diagonal matrix of eigenvalues and a unitary matrix of eigenvectors, and wherein the T noise eigenvectors are T eigenvectors in the unitary matrix corresponding to T smallest eigenvalues in the diagonal matrix.

28. The method of claim 24, wherein the obtaining a channel estimate for the communication channel comprises computing a cost value for each of N hypothesized delay values based on a cost function of the T noise eigenvectors and the hypothesized delay value, where N is an integer greater than T, and wherein N cost values are computed for the N hypothesized delay values, identifying L largest cost values among the N cost values, where L is an integer one of greater, and providing L hypothesized delay values for the L largest cost values as delays of L channel taps in an impulse response estimate for the communication channel, and wherein the channel estimate for the communication channel comprises the L channel tap delays.

29. The method of claim 28, wherein the obtaining a channel estimate for the communication channel further comprises deriving gains of the L channel taps in the impulse response estimate based on the L tap delays and the frequency response estimate, and wherein the channel estimate for the communication channel further comprises the L channel tap gains.

30. The method of claim 29, wherein the obtaining a channel estimate for the communication channel further comprises obtaining a full frequency response estimate for N total subbands of the communication channel based on the impulse response estimate.

31. An apparatus operable to perform channel estimation for a communication channel in a communication system, comprising:

a detector operative to obtain a frequency response estimate for the communication channel; and a spectral estimator operative to derive a correlation matrix based on the frequency response estimate, obtain T noise eigenvectors based on the correlation matrix, where T is an integer one of greater, and obtain a channel estimate for the communication channel based on the T noise eigenvectors.

32. The apparatus of claim 31, wherein the detector is operative to obtain a plurality of partial frequency response estimates for a plurality of different sets of subbands, wherein each partial frequency response estimate is for a portion of a total bandwidth for the system and is obtained from one set of subbands, and wherein the spectral estimator is operative to derive the correlation matrix based on the plurality of partial frequency response estimates.

33. An apparatus operable to perform channel estimation for a communication channel in a communication system, comprising:

means for obtaining a frequency response estimate for the communication channel;

means for deriving a correlation matrix based on the frequency response estimate;

means for obtaining T noise eigenvectors based on the correlation matrix, where T is an integer one of greater; and means for obtaining a channel estimate for the communication channel based on the T noise eigenvectors.

34. The apparatus of claim 33, further comprising:

means for obtaining a plurality of partial frequency response estimates for a plurality of different sets of subbands, wherein each partial frequency response estimate is for a portion of a total bandwidth for the system and is obtained from one set of subbands, and wherein the frequency response estimate for the communication channel comprises the plurality of partial frequency response estimates.

* * * * *

UNITED STATES PATENT AND TRADEMARK OFFICE
CERTIFICATE OF CORRECTION

PATENT NO. : 7,609,786 B2  
APPLICATION NO. : 11/021292  
DATED : October 27, 2009  
INVENTOR(S) : Arvind Vijay Keerthi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1245 days.

Signed and Sealed this

Twelfth Day of October, 2010

David J. Kappos  
*Director of the United States Patent and Trademark Office*